(12) United States Patent
Oliver

(10) Patent No.: US 6,289,140 B1
(45) Date of Patent: Sep. 11, 2001

(54) VOICE CONTROL INPUT FOR PORTABLE CAPTURE DEVICES

(75) Inventor: Thomas C Oliver, Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/219,970

(22) Filed: Dec. 23, 1998

Related U.S. Application Data

(63) Continuation-in-part of application No. 09/026,082, filed on Feb. 19, 1998.

(51) Int. Cl.7 .................................................. G06K 9/22
(52) U.S. Cl. ........................................... 382/313; 704/275
(58) Field of Search ........................... 382/313; 375/133; 370/320, 335; 707/200, 104; 348/143, 154, 155; 704/275, 270.1; 379/88.1; 600/443

(56) References Cited

U.S. PATENT DOCUMENTS

| | | | |
|---|---|---|---|
| 4,389,109 | 6/1983 | Taniguchi et al. | 354/60 L |
| 4,677,569 * | 6/1987 | Nakano et al. | 364/513.5 |
| 4,776,016 * | 10/1988 | Hansen | 704/275 |
| 4,951,147 * | 8/1990 | Aknar et al. | 358/209 |
| 5,335,313 | 8/1994 | Douglas | 395/2.84 |
| 5,544,654 * | 8/1996 | Murphy et al. | 600/443 |
| 5,548,335 | 8/1996 | Mituhashi et al. | 348/373 |
| 5,794,251 * | 8/1998 | Watanabe et al. | 707/200 |
| 5,838,718 * | 11/1998 | Ichihashi | 375/202 |
| 6,157,705 * | 12/2000 | Perrone | 379/88.1 |

OTHER PUBLICATIONS

International Application No. PCT/US93/06520, Title: Hands–Free Ultrasonic Test View (HF–UTV), Publication No. WO 94/01766, Publication Date: Jan. 20, 1994, Applicant: Sierra Matrix Inc.

European Patent Application, Title: Method And Apparatus For Speech Analysis And Speech Recognition, Application/Publication No. 91480157.6/0 485 315 A2, Applicant: International Business Machines Corporation Int Cl. G10L 5/06.
International Application No. PCT/US98/09829, Title: Speech Activated Control Adaptable To Any Commande Word And Associated Keystroke, Publication No. WO 98/52186, Publication Date: Nov. 19, 1998, Applicant: K2 Interactive.
European Patent Application, Title: Camera On–Board Voice Recognition, Application/Publication No. 95113422.0/0 699 941 A1, Applicant: Eastman Kodak Company Int Cl. G03B 17/24.
International Application No. PCT/US94/02888, Title: Data Entry Device, Publication No. WO 94/20899, Publication Date: Sep. 15, 1994, Applicant: Bruce Barker.

* cited by examiner

*Primary Examiner*—Jose L. Couso
*Assistant Examiner*—Anh Hong Do

(57) ABSTRACT

A portable capture device, such as a hand held document scanner or digital camera, that receives voice commands for operation control is disclosed. Commands such as "scan", "save", "delete", "left", "zoom in", and "send" are illustrative, where the capture device will perform the predetermined functions associated with the command names. In one embodiment, the portable capture device trains itself to recognize the user's spoken commands through voice analysis software. The voice analysis software may be located within the capture device, or on a host computer system and accessed by the capture device while tethered to the host computer system. The capture device has an audio input/output system under the control of a controller. Upon receiving a voice control input command, the controller saves the digitized voice input in dynamic memory. The controller then compares the command received with the commands stored in a command recognition table held in static memory.

18 Claims, 6 Drawing Sheets

VOICE CONTROL INPUT FOR PORTABLE CAPTURE DEVICES

CROSS REFERENCE TO RELATED APPLICATIONS

This application is a continuation-in-part of application Ser. No. 09/026,082 of Thomas C. Oliver filed Feb. 19. 1998 entitled Voice Annotation of Scanned Images for Portable Scanning Applications, hereby incorporated by reference.

TECHNICAL FIELD

This invention relates to portable capture devices such as hand held document scanners or digital cameras. Even more particularly, the invention relates to voice control input for portable hand held document scanners or digital cameras.

BACKGROUND OF THE INVENTION

Portable capture devices, such as hand held document scanners or digital cameras, have proven to be very useful tools in certain situations. Their portability and ease in capturing and saving information from various locations away from a user's office or work place are the primary benefits of such capture devices.

Though such portable capture devices are small, reducing their size to be even smaller and more portable is desirable. However, further reductions in size are fairly limited by the current physical user interface requirements. Most portable hand held document scanners, for example, have anywhere from ten to fifteen user input buttons to allow the user to control a number of different operations. Such operations include: start and stop scanning; save and delete scanned information; send scanned information; and view, zoom, and pan scanned data on the scanner display. The buttons must be large enough and adequately spaced to allow a user to easily control and press the buttons. The buttons must also be placed in such a fashion that the portable scanner device can be handled by the user without pressing buttons to activate various functions not intended to be activated in the normal transport and handling of the capture device, and while using the portable scanner device to scan a document. Buttons sometimes must be used in combination, making the scanner device somewhat awkward to use. Due to the physical space occupied by the user input buttons, the output display on such capture devices is often quite small by necessity, making use of the display less functional than desired. The same can be said for portable digital cameras.

It is thus apparent that there is a need in the art for an improved method or apparatus which will reduce the number of user input buttons required to operate the portable capture device and at the same time reduce the complexity of the user interface. There is also a need in the art to further reduce the size of portable capture devices to further increase their portability and ease of use. A further need in the art is to utilize a larger, more readable display in portable capture devices while maintaining a reduced overall size for the portable capture device. The present invention meets these and other needs in the art.

DISCLOSURE OF THE INVENTION

It is an aspect of the present invention to utilize user voice input to control the operation of a portable capture device, such as a hand held document scanner or digital camera.

It is another aspect of the invention to reduce the number of user input buttons on a portable capture device.

Yet another aspect of the invention is to reduce the overall size of a portable capture device through the elimination of a number of user input buttons.

Still another aspect of the invention is to increase the output display area of a portable capture device while decreasing the overall size of the portable capture device by utilizing some of the physical space formerly occupied by a number of user input buttons that have been eliminated.

A further aspect of the invention is to key the operation of a portable capture device to an audible password spoken by a user.

A still further aspect of the invention is to tether a portable capture device to a host computer to train the portable capture device to recognize a user's voice control input commands.

Another further aspect of the invention in another embodiment is to utilize a limited voice control input command set in a portable capture device that does not require training by a host computer.

The above and other aspects of the invention are accomplished in a portable capture device that receives voice control input commands to control its operation. To initiate an action with a portable capture device, such as a scan with a portable hand held document scanner, the user powers on the capture device and then inputs the voice control input command "scan", which is picked up by the capture device through a voice pickup component located in the capture device. Upon recognizing the command "scan", the capture device will wait a predetermined amount of time, usually a few seconds, for the user to position the capture device on a document. After the time delay, the capture device is ready to scan, which is indicated to the user by an audible beep or audible repeat of the word "scan". The user then moves the portable hand held document scanner across the surface of the document. Upon detecting lack of movement for a predetermined period of time, the portable hand held document scanner will once again beep or output another audible word such as "done" or "stop" to indicate to the user that the capture device believes it should no longer be in scan mode. If the capture device detects no further movement within a predetermined amount of time from the beep or audible word output, usually a few seconds, the portable hand held document scanner leaves the scan mode and begins processing the scan data for output to the user on the portable hand held document scanner display. In an alternative embodiment of the invention, the user pushes a button on the portable hand held document scanner to stop the scan mode. The portable hand held document scanner then processes the scan data for output to the user.

Once the image is output to the display, the user can issue a voice control input command to "save" or "delete" the scanned image. The user may also view different parts of the image by issuing voice control input commands such as "zoom in", "zoom out", "left", "right", "up", or "down". The user may also transfer a scanned image, or several images, to a host computer through an established connection by issuing voice control input commands such as "send" or "send all". Once the capture device recognizes the command, it performs the desired operation. If the capture device processes a voice control input command and finds no match, an indication of no match, such as an audible word or a beep pattern, is output to the user. The capture device then waits to receive the next voice control input command.

Voice control input allows a means for the capture device to be "keyed" to a particular user through the use of a spoken password. Once the capture device is powered on, it will not function until the proper password is received and processed. This would prevent anyone except the user from using the capture device as long as the user's password is not overheard.

In one embodiment of the invention a portable capture device, such as a portable hand held document scanner, is trained to recognize the user's spoken voice control input commands through voice analysis software. The voice analysis software may be located within the capture device, or located in a host computer system and accessed by the capture device while tethered to the host computer system. In the preferred embodiment of the invention, the tethered mode is used to take advantage of the greater computing power available in the host computer system and to reduce the complexity of the capture device.

For example, in using the voice analysis software in the training mode, the user would be given a predetermined list of the functions that can be executed by the capture device with a voice control input command. Command one, for example, may represent a set of instructions for performing a scan function of a document or image. In selecting command one for training and analysis, the user would be prompted by the voice analysis software to choose a word that the user wants to use to invoke the set of instructions for the scan function. The user would then be prompted to repeat the chosen word a number of times. A logical choice would be to choose the word "scan", but any word chosen by the user could be used. Each repetition of the word "scan" is picked up by the capture device and analyzed by the voice analysis software to develop a recognition pattern to encompass the variations and inflections in the user's voice in issuing the "scan" command. The recognition patterns for all the words chosen by the user to invoke the various functions are stored in a static memory in the capture device in a command recognition table. The recognition patterns in the command recognition table are each linked to the predetermined sets of instructions for the various functions, which are also stored in the static memory. Thus, when the spoken voice control input command word is received and recognized by the capture device, the set of instructions associated with that command word are executed. This embodiments language independent enabling foreign languages to be utilized for the voice control input command words, since the set of instructions for a function are tied to the user's word choice and subsequent training and voice analysis of that word choice.

In another embodiment of the invention, there is no word choice given the user for training and voice analysis. The recognition patterns in the command recognition table are predetermined and tied to specific words the user must use. The user would have to modify his or her pronunciation of the command word "scan", for example, until the capture device recognized the command as spoken by the user. Thus, in this embodiment, the device would be primarily directed to a particular language where the command words were indicative of the resulting actions. Foreign language versions of the device could be made for users utilizing foreign words indicative of the resulting actions.

The portable capture device has a voice audio input/ output system under the control of a controller. Upon receiving a voice control input command, the controller saves the digitized voice input in dynamic memory. The controller then processes the command and compares the recognition pattern for the command with the recognition patterns stored in the command recognition table held in static memory. When a match is found, execution of the set of instructions tied to the recognition pattern begins. The set of instructions for a particular command may include acknowledging the command back to the user by outputting an audible beep, audible playback of the command name, or illuminating a light emitting diode (LED). Particular commands may also have one or more time delays built into the set of instructions to allow time for the user to physically manipulate the capture device or to cancel the command. If the user has changed his mind about the command just issued, or, if the capture device interpreted the command incorrectly, the user can cancel the command before it is executed through a cancel or clear button on the capture device or through a voice control input command that cancels the previous command received. Otherwise, if no input is received to cancel the command, the set of instructions for the command are executed.

For portable capture devices that allow voice annotation of captured image data files, such as with a digital camera, or document data files, such as with a portable scanner, the capture device distinguishes a voice control input command from a voice annotation. In one embodiment of the invention, a voice control input annotation command is used to prepare the capture device to accept the immediately following voice input as a voice annotation to the current image data file or document data file. A predetermined length of time of silence without voice input serves as the indication that the voice annotation is complete. In another embodiment of the invention, a use paradigm similar to a record button on a tape recorder is utilized. A button on the capture device is pressed and held down to signify that the following voice input is for annotation purposes, and not a command. Once the voice annotation is complete, the user releases the button, and the captured voice annotation is processed by the capture device and connected to the current image data file or document data file.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the invention. This description is not to be taken in a limiting sense but is made merely for the purpose of describing the general principles of the invention. The scope of the invention should be determined by referencing the appended claims.

Figure 1:
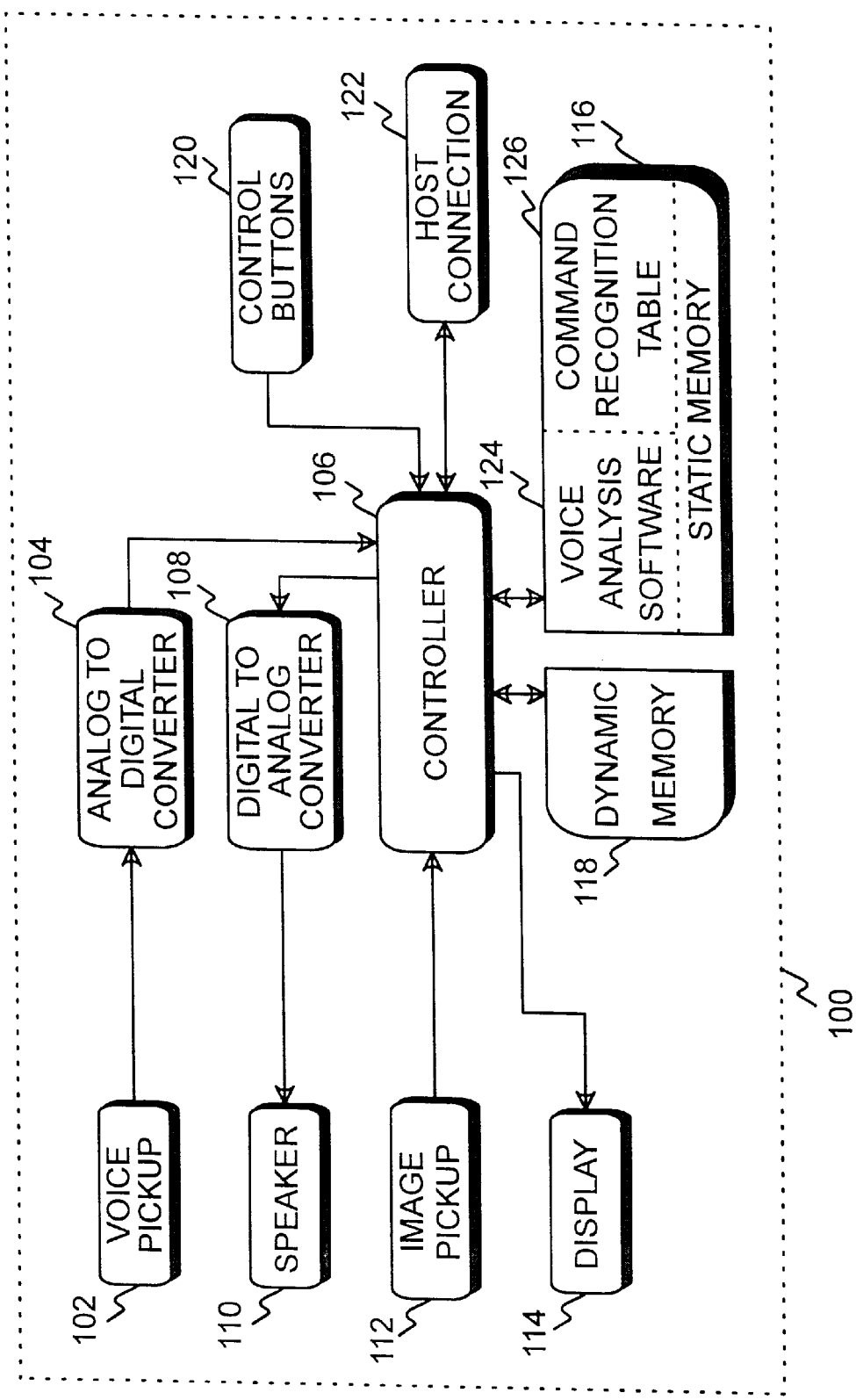
FIG. 1 shows a block diagram of a capture device of the present invention.

FIG. 1 shows a block diagram of a capture device of the present invention. Referring now to FIG. 1, capture device 100 is powered on by pressing a power on button, which is one of several control buttons 120 on capture device 100.

Capture device 100 receives its power from internal batteries (not shown in FIG. 1), or alternatively through a power cable connected to capture device 100 and plugged into a power source (also not shown in FIG. 1). Voice control input commands for controlling capture device 100 are given by a user speaking in close enough proximity to be picked up by voice pickup component 102. Voice pickup component 102 converts the users speech into an analog signal. Connected to voice pickup component 102 is an analog-to-digital converter 104, which converts the analog signal generated by voice pickup component 102 into a digital signal. The digital signal is sent by analog-to-digital converter 104 to controller 106, which saves the signal in dynamic memory 118, which is connected to controller 106. Then, in the preferred embodiment of the invention, controller 106 calls voice analysis software 124 stored in static memory 116 to perform a series of frequency domain transforms on the digital signal stored in dynamic memory 118. Voice analysis software 124 generates a recognition pattern, which is a spectral transform, that is compared to recognition patterns (also spectral transforms) for commands stored in static memory 116 in command recognition table 126. One skilled in the art will recognize that any other suitable method for recognizing voice patterns could be used in the present invention instead of spectral transforms.

If there is a match, then controller 106 accesses the set of instructions in command recognition table 126 linked with the recognition pattern for the command. For example, after speaking a voice control input command to scan a document, the user moves capture device 100 such that image pickup component 112 comes in contact with a portion or all of the surface of the document. Image pickup component 112 optically reads sample points from the surface of the document and generates a grey scale value for each point sampled. Controller 106 receives the grey scale values for the sample points and assembles them into an image array. The result may be output to display 114, which is connected to controller 106, showing a visual representation of the surface of the scanned document. Controller 106 may also convert the grey scale values to binary form for display or for storage. The image array, in either grey scale or binary form, is passed from controller 106 and stored as a document data file in static memory 116.

After scanning a document, the user may speak into voice pickup component 102 to voice annotate the document data file with a descriptive narrative or other information deemed useful by the user. To distinguish a voice annotation, which is a fairly continuous stream of voice input over an extended period of time, from a voice control input command, which is normally just one or two words, in one embodiment of the invention, the user presses and holds down one of the several control buttons 120 before speaking, sending button down input to controller 106, indicating that the following stream of voice input is an annotation and not a command. After the user finishes the voice annotation, the user releases the control button 120, sending button up input to controller 106, which marks the end of the stream of voice input. The stream of voice input that was captured is stored as a voice annotation file in static memory 116, and connected to a document data file that has been scanned and stored in static memory 116.

In another embodiment of the invention, one of the voice control input commands is a voice annotation command. After issuing the voice control input annotation command, the following stream of voice input is captured for annotation purposes, and stored as a voice annotation file, and connected to an image data file or document data file that has been captured and stored in the capture device. When the user stops speaking for more than a predetermined period of time, such as between five to ten seconds, the device interprets such predetermined period of absence of voice input as marking the end of the stream of voice input.

Upon receiving and recognizing the voice control input annotation command, or the pressing and holding of one of several control buttons 120 indicating that the following voice input is for annotation purposes, the voice input from the user is captured by voice pickup component 102 and converted to an analog signal. Analog-to-digital converter 104 converts the analog signal generated by voice pickup component 102 into a digital signal. The digital signal is sent to controller 106. Controller 106 stores the voice annotation digital signal as a separate voice annotation file in static memory 116 and connects the image data file or document data file with the voice annotation file.

The user may request that document scanning device 100 play back a voice annotation file. Controller 106 retrieves the voice annotation file requested from static memory 116, passes it to digital-to-analog converter 108, which converts the digital signal to an analog signal, and passes the analog signal to speaker 110, which generates audio output. In addition, a particular set of instructions for a command may send audible output to the user to acknowledge receipt of the command utilizing digital-to-analog converter 108 and speaker 110, or illuminating an LED (not shown in FIG. 1).

Image data files or document data files and the connected voice annotation files may be copied to another device, such as host computer system 200 (FIG. 2) through host connection 122, which is connected to controller 106.

Figure 2:
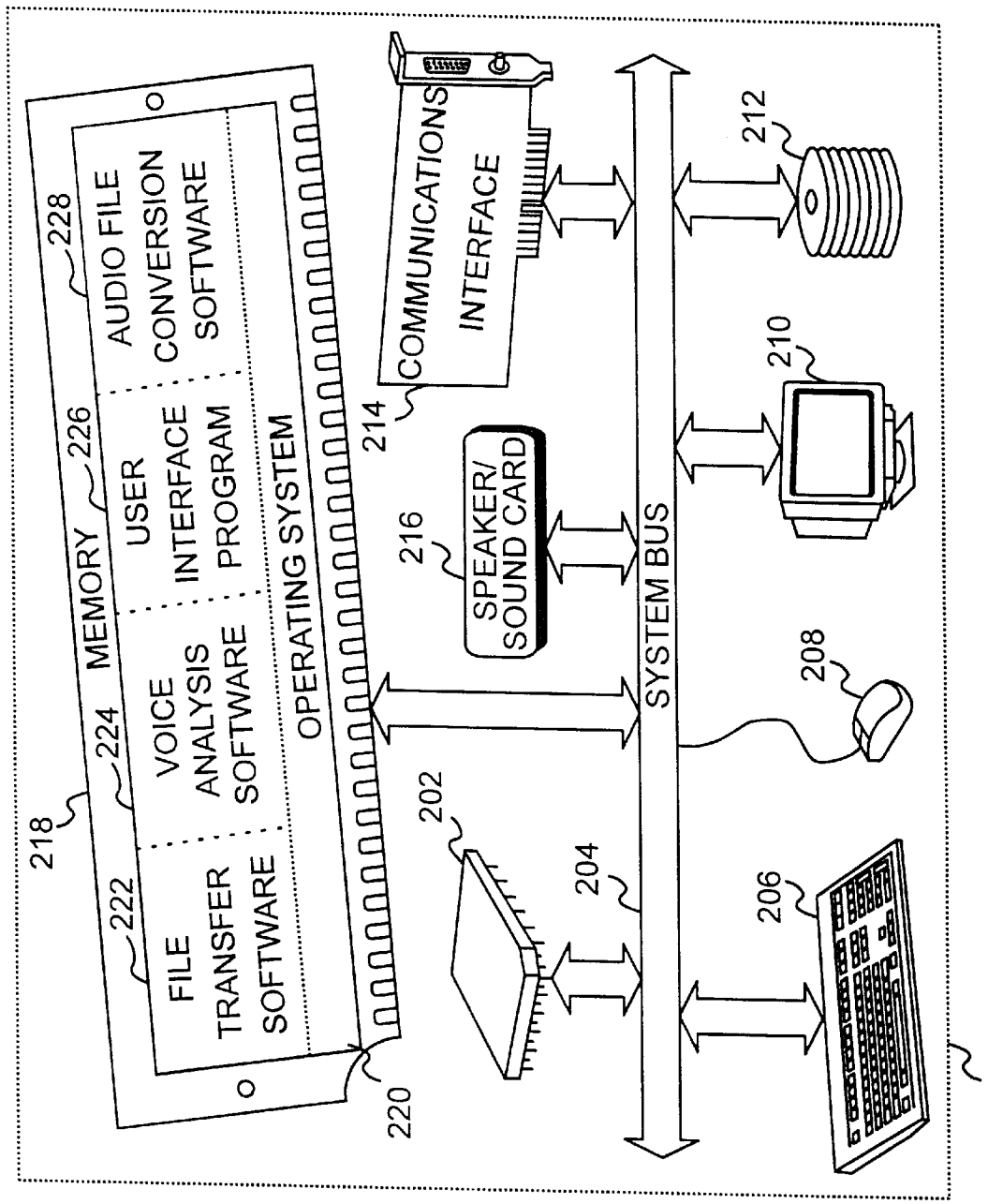
FIG. 2 shows a block diagram of a host computer system in communication with the capture device of the present invention.

FIG. 2 shows a block diagram of a host computer system associated with the present invention. Referring now to FIG. 2, host computer system 200 contains a processing element 202. Processing element 202 communicates to other elements of host computer system 200 over a system bus 204. A keyboard 206 allows a user to input information into host computer system 200 and a graphics display 210 allows host computer system 200 to output information to the user. A mouse 208 is also used to input information, and a storage device 212 is used to store data and programs within host computer system 200. Communications interface 214, also connected to system bus 204, receives information from capture device 100 (FIG. 1). Speaker/sound card 216, connected to system bus 204, outputs audio information to the user. Some host computer systems may not have a sound card, in which case the speaker is driven only by software. A memory 218, also attached to system bus 204, contains an operating system 220, file transfer software 222, voice analysis software 224, user interface program 226, and audio file conversion software 228.

File transfer software 222 receives image data files or document data files and the connected voice annotation files transferred from host connection 122 (FIG. 1) of capture device 100 through communications interface 214 and system bus 204, and saves them to storage device 212. When the user accesses user interface program 226, and selects an image data file or document data file having a voice annotation file, audio file conversion software 228 decompresses and converts the voice annotation file to an audio file format recognizable by speaker/sound card 216. Speaker/sound card 216 outputs the audio information to the user. After hearing the audio information, the user may choose to view the image data file or document data file. If so, user interface program 226 is suspended, the application program associated with the image data file or document data file is called, and the file is displayed in graphics display 210.

In the preferred language independent embodiment of the invention, voice analysis software 224, which is also located in capture device 100, is used by a user to train capture device 100 to recognize the user's voice control input commands in any language. Capture device 100 is first connected to host computer system 200 to take advantage of the greater computing power. The user then accesses voice analysis software 224 and selects a particular function, to be represented by a word chosen by the user to invoke the function, to train, such as the scan function. The user then repeats the word chosen by the user to represent the scan function a number of times. The word most likely to be chosen by the user is the word, in whatever language the user speaks, that is equivalent or closest to the scan function. For an English speaking user, the most likely word chosen would be the word "scan". The user's repetition of the word "scan" is captured by voice pickup component 102 (FIG. 1), is processed in capture device 100 into a signal, and transferred via host connection 122 to communications interface 214. Communications interface 214 transfers each signal via system bus 204 to memory 218, where voice analysis software 224 analyzes each signal. Voice analysis software 224 develops a recognition pattern based on each sample signal to encompass the variations and inflections in the user's voice in issuing the "scan" command. This process is repeated for each of the functions that can be invoked with a voice input control command for capture device 100. The recognition patterns established for all the words chosen for training are then downloaded from host computer system 200 to capture device 100, and stored in static memory 116 (FIG. 1) in command recognition table 126 for use in subsequent control operations.

Figure 3:
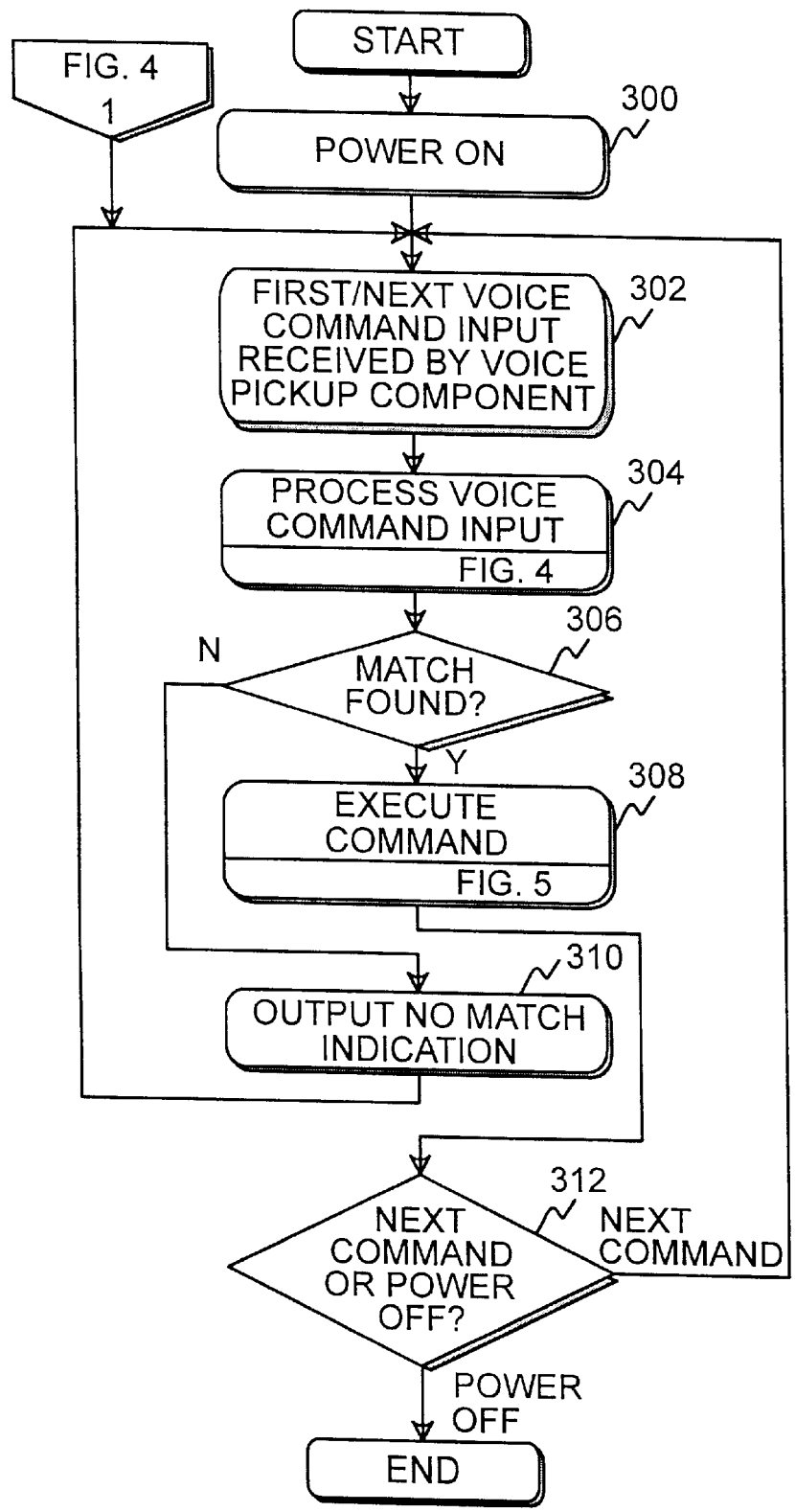
FIG. 3 shows a flow chart of the overall flow of voice control input for the operation of the capture device of the present invention.

FIG. 3 shows a flow chart of the overall flow of operation for voice control input of a capture device. Referring now to FIG. 3, in step 300 capture device 100 (FIG. 1) is powered on. In step 302 a first voice control input command, which in the preferred embodiment of the invention would be the password, is received by voice pickup component 102 (FIG. 1). Step 304 calls FIG. 4 to process the voice control input command. Upon returning from FIG. 4, step 306 determines if a match was found in the comparison performed in step 408 from FIG. 4 between the recognition pattern of the voice control input command received in step 302 and any of the recognition patterns stored in command recognition table 126. If no match was found, step 310 outputs an indication of no match to the user, which may be an audible word or a specific beep pattern. Control then returns to step 302 where capture device 100 awaits the next voice control input command.

Figure 4:
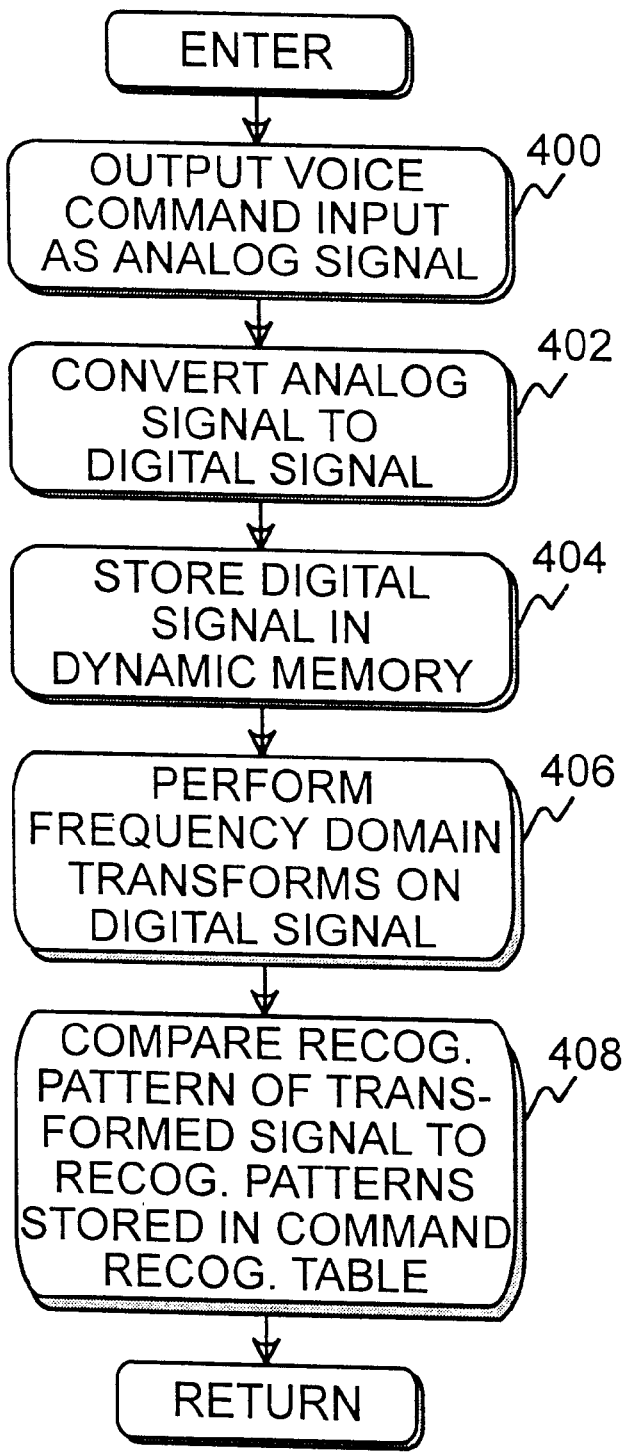
FIG. 4 shows a flow chart of processing a voice control input command by the capture device of the present invention.
Figure 5:
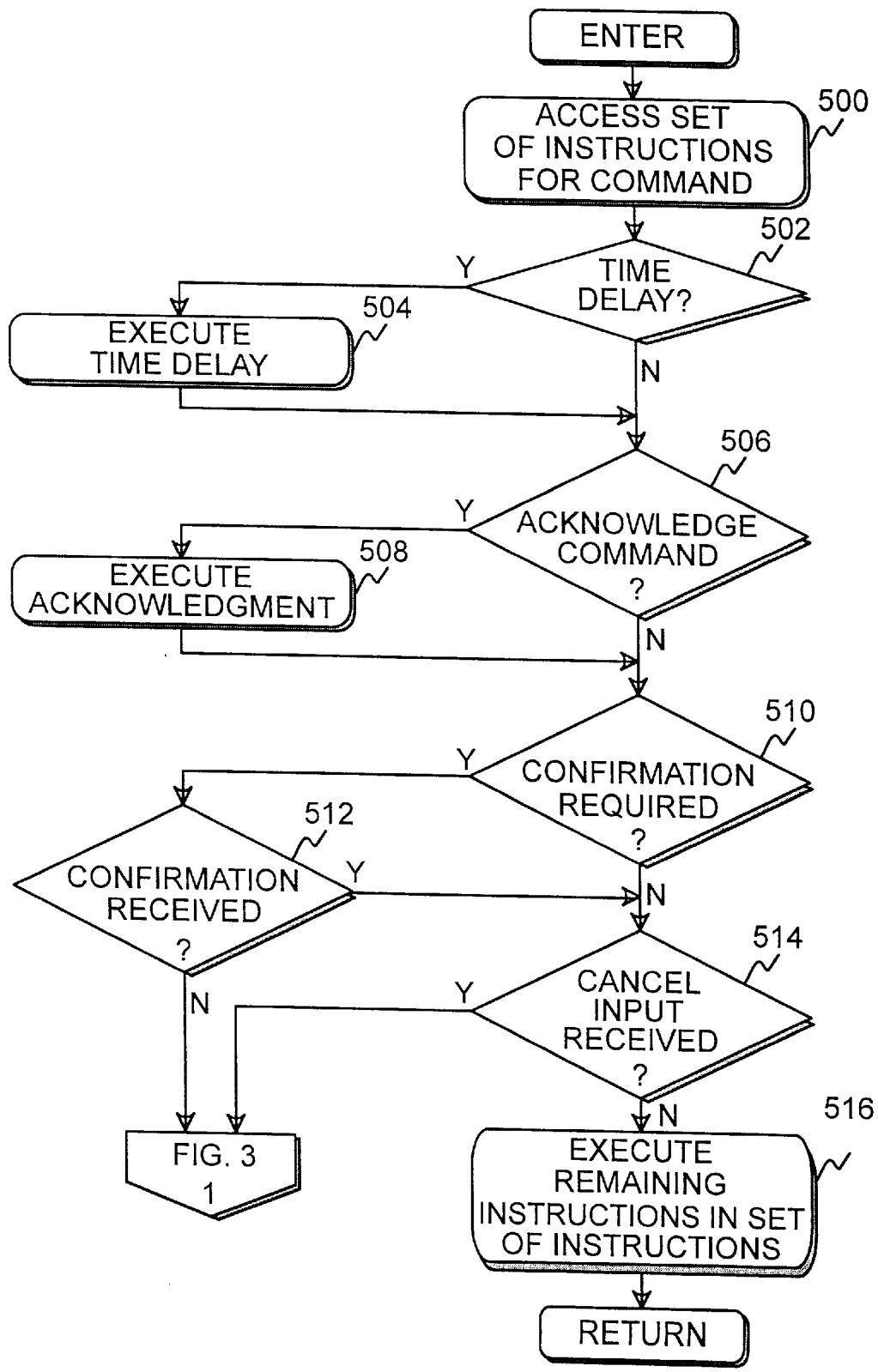
FIG. 5 shows a generalized flow chart for executing a command by the capture device of the present invention.

If step 306 determines that a match was found in step 408 from FIG. 4, then control passes to step 308 which calls FIG. 5 to execute the set of instructions associated with the command. Upon returning from FIG. 5, step 312 determines if a next voice control input command is received, or if the power is turned off. If a next command is received, control returns to step 302. If the power is turned off, then operation of capture device 100 ends.

FIG. 4 shows a flow chart of processing a voice control input command by the capture device of the present invention. Referring now to FIG. 4, in step 400 the voice control input command captured by voice pickup component 102 (FIG. 1) is output by voice pickup component 102 as an analog signal. In step 402 analog-to-digital converter 104 (FIG. 1) receives as input the analog signal, converts the analog signal to a digital signal, and outputs the digital signal to controller 106 (FIG. 1). In step 404, controller 106 receives as input the digital signal and stores the digital signal in dynamic memory 118 (FIG. 1). In step 406 controller 106 calls voice analysis software 120 to perform frequency domain transforms on the digital signal stored in step 404, creating a recognition pattern. In step 408, controller 106 compares the recognition pattern from step 406 with the recognition patterns for voice control input commands stored in command recognition table 126 held in static memory 116 (FIG. 1). Control then returns to FIG. 3.

FIG. 5 shows a generalized flow chart for executing a command by the capture device of the present invention. One skilled in the art will recognize that the order of the steps may vary greatly depending upon the desired operation associated with a specific command. Referring now to FIG. 5, step 500 accesses the set of instructions linked to the recognition pattern matching the voice control input command received in step 302. Step 502 determines if the set of instructions begins with a time delay instruction. If the answer is yes, then in step 504 the time delay instruction is executed, suspending further execution of the remaining instructions in the set of instructions until the amount of time specified in the time delay has elapsed. After the time delay of step 504, or if step 502 determined there was no time delay instruction, control passes to step 506.

Step 506 determines if the next instruction in the set of instructions requires an output of acknowledgment of the command. If the answer is yes, then in step 508 the acknowledgment instruction is executed. Depending on the particular command, the acknowledgment may be made in the form of an audible beep, a voice playback of the voice control input command received, illuminating an LED, or any other appropriate means. After the acknowledgment instruction is executed in step 508, or if step 506 determined there was no acknowledgment instruction, control passes to step 510.

Step 510 determines if the next instruction in the set of instructions requires confirmation input by the user before further execution of the remaining instructions. Certain commands, such as the delete command, may require confirmation as a safety precaution to help prevent the inadvertent destruction of valuable data. If the answering step 510 is yes, then step 512 determines if the proper confirmation input is received from the user. Based on the particular command, the confirmation may require the user to press one of the several control buttons 120. Or, the user may have to issue another voice control input command as confirmation. If the proper confirmation input is not received, or no input at all is received in step 512, control returns to step 302 in FIG. 3 to await the next voice control input command. If the proper confirmation input is received in step 512, or if step 510 determined there was no confirmation instruction, control passes to step 514.

Step 514 determines if input to cancel the command is received. If cancel input is received in step 514, then control returns to step 302 in FIG. 3 to await the next voice control input command. If no cancel input is received in step 514, then control passes to step 516 which executes the remaining instructions in the set of instructions for the command. Upon executing the last instruction in the set of instructions, control returns to step 312 in FIG. 3.

Figure 6:
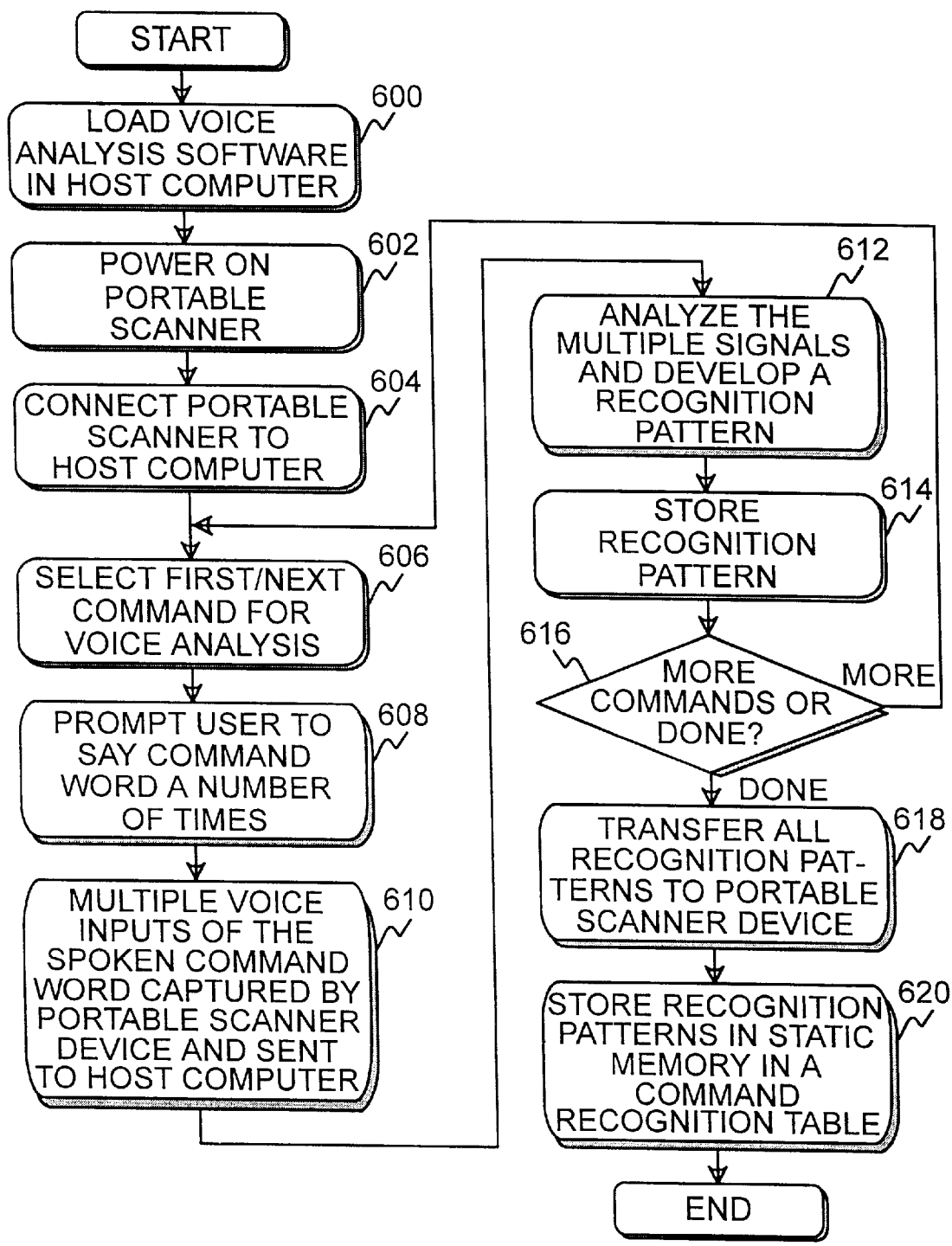
FIG. 6 shows a flow chart of training the capture device of the present invention to recognize voice control input commands.

FIG. 6 shows a flow chart of training the capture device of the present invention to recognize user voice control input commands. Referring now to FIG. 6, in step 600 voice analysis software 224 is loaded into memory 218 in host computer system 200 (FIG. 2). Capture device 100 is powered on in step 602. In step 604 capture device 100 (FIG. 1) is connected to host computer system 200. This could be through a cable, an infrared beam, or any other suitable connection. In step 606, input from a user is received in voice analysis software 224 selecting a first function for training and voice analysis of the command word for invoking the function. Voice analysis software 224 then prompts the user in step 608 to audibly repeat the command word the user has chosen to invoke the first function into voice pickup component 102 (FIG. 1) of capture device 100 a multiple number of times. In step 610, the multiple voice inputs of the command word captured by voice pickup component 102 are processed by capture device 100 into digital signals and sent to voice analysis software 224 in host computer system 200. The voice analysis software 224 in step 612 analyzes the multiple digital signals received in step 610 and develops a recognition pattern for the command word. The recognition pattern of step 612 is stored in memory 218 in step 614.

Step 616 determines if the user has selected a next function for training and voice analysis of the command word for invoking the next function, or if an indication is received that the user is done selecting functions fortrining and voice analysis. If a next function has been selected in step 616, control returns to step 606. If an indication is received that the user is done selecting functions, then in step 618 voice analysis software 224 transfers all recognition patterns determined in step 612 and stored in step 614 to capture device 100 over the connection established in step 602. In step 620 the recognition patterns transferred in step 618 are stored in static memory 116 in command recognition table 126, such that the recognition pattern for each function is linked to the set of instructions, also stored in command recognition table 126, that will be executed upon receiving the voice control input command that, when processed into a recognition pattern, matches one of the recognition patterns determined in step 612. After step 620 training and voice analysis of command words for capture device 100 ends.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A voice control input method for a capture device, said method comprising the steps of:
   (a0) using a separate host computer system for training said capture device to accept voice commands, comprising the steps of
      (a0a) loading voice analysis software into a memory in said host computer system, wherein sad host computer system is separate from said capture device,
      (a0b) connecting said capture device to said host computer system,
      (a0c) selecting a predetermined function, with said voice analysis software, for training and voice analysis of at least one word for invoking said predetermined function,
      (a0d) capturing a plurality of voice inputs of said at least one word in said voice pickup component of said capture device,
      (a0e) processing said plurality of voice inputs into a plurality of digital signals in said capture device,
      (a0f) sending said plurality of digital signals from said capture device to said host computer system,
      (a0g) analyzing said plurality of digital signals with said voice analysis software,
      (a0h) developing said at least one recognition pattern from said analysis of said plurality of digital signals with said voice analysis software,
      (a0i) storing said at least one recognition pattern in said memory in said host computer system, and
      (a0j) transferring said at least one recognition pattern in said memory in said host computer system to said command recognition table in said static memory in said capture device, wherein said at least one recognition pattern is linked to said first set of instructions stored in said command recognition table for performing said predetermined function;
   (a) capturing a first voice control input command with a voice pickup component in said capture device;
   (b) converting said first voice control input command into a first analog signal;
   (c) converting said first analog signal into a first digital signal;
   (d) converting said first digital signal into a first recognition pattern;
   (e) comparing said first recognition pattern to at least one recognition pattern stored in a command recognition table in a static memory in said capture device; and
   (f) when said first recognition pattern matches said at least one recognition pattern stored in said command recognition table, executing a first set of instructions linked to said at least one recognition pattern.

2. The voice control input method for a capture device according to claim 1 wherein said capture device is a scanner device.

3. The voice control input method for a capture device according to claim 1 wherein said capture device is a digital camera.

4. The voice control input method for a capture device according to claim 1 wherein step (b) further comprises the step (b1), and step (c) further comprises the steps (c1) through (c3):
   (b1) inputting, to an analog-to-digital converter in said capture device, said first analog signal;
   (c1) converting said first analog signal, in said analog-to-digital converter, to said first digital signal;
   (c2) transferring said first digital signal from said analog-to-digital converter to a controller in said capture device; and
   (c3) storing, by said controller, said first digital signal in a dynamic memory in said capture device.

5. The voice control input method for a capture device according to claim 1 wherein step (d) further comprises the step (d1):
   (d1) performing a plurality of frequency domain transforms on said first digital signal stored in a dynamic memory in said capture device, generating said first recognition pattern, wherein said first recognition pattern is a spectral transform of said first digital signal.

6. The voice control input method for a capture device according to claim 1 wherein said at least one word is language independent.

7. The voice control input method for a capture device according to claim 1 further comprising the steps of:
   (a0k) repeating steps (a0c) through (a0j) for a plurality of predetermined functions, wherein a plurality of recognition patterns are developed from a plurality of said plurality of voice inputs for a plurality of said at least one words, and further wherein said plurality of recognition patterns are stored in said command recognition table in said static memory in said capture device, wherein each of said plurality of recognition patterns are linked to one of a plurality of predetermined sets of instructions stored in said command recognition table for performing one of said plurality of predetermined functions.

8. The voice control input method for a capture device according to claim 1 wherein step (a0a) is replaced by the new step (a0a), steps (a0b), (a0f), and (a0i) are eliminated, and step (a0j) is replaced by the new step (a0j):
   (a0a) accessing voice analysis software in said static memory in said capture device; and
   (a0j) storing said at least one recognition pattern in said command recognition table in said static memory in said capture device, wherein said at least one recognition pattern is linked to said first set of instructions stored in said command recognition table for performing said predetermined function.

9. The voice control input method for a capture device according to claim 8 wherein said at least one word is language independent.

10. The voice control input method for a capture device according to claim 8 further comprising the steps of:
    (a0k) repeating steps (a0c) through (a0j) for a plurality of predetermined functions, wherein a plurality of recognition patterns are developed from a plurality of said plurality of voice inputs for a plurality of said at least one words, and further wherein said plurality of recognition patterns are stored in said command recognition table in said static memory in said capture device, wherein each of said plurality of recognition patterns are linked to one of a plurality of predetermined sets of instructions stored in said command recognition table for performing one of said plurality of predetermined functions.

11. The voice control input method for a capture device according to claim 1 wherein said first recognition pattern, representing a password command, matches said at least one recognition pattern stored in said command recognition table, and further wherein said first set of instructions executed in step (f) further comprises the following step (f1):
    (f1) enabling said capture device to receive and process additional voice control input commands.

12. The voice control input method for a capture device according to claim 1 wherein said first recognition pattern, representing a voice annotation command, matches said at least one recognition pattern stored in said command recognition table, and further wherein said first set of instructions executed in step (f) further comprises the following steps (f1) through (f8):
    (f1) until a predetermined period of absence of voice input has occurred, performing steps (f2) through (f6);
    (f2) capturing a stream of voice input with said voice pickup component in said capture device;
    (f3) converting said stream of voice input into a second analog signal;
    (f4) inputting, to an analog-to-digital converter in said capture device, said second analog signal;
    (f5) converting said second analog signal, in said analog-to-digital converter, to a second digital signal;
    (f6) transferring said second digital signal from said analog-to-digital converter to a controller in said capture device;
    (f7) storing, by said controller, said second digital signal in said static memory in said capture device as a voice annotation file; and
    (f8) connecting said voice annotation file to a data file stored in said static memory.

13. The voice control input method for a capture device according to claim 1 further comprising the steps of:
    (g) receiving button down input in a controller from an annotation control button on said capture device;
    (h) until button up input is received in said controller from said annotation control button, performing steps (i) through (m);
    (i) capturing a stream of voice input with said voice pickup component;
    (j) converting said stream of voice input into a second analog signal;
    (k) inputting, to an analog-to-digital converter in said capture device, said second analog signal;
    (l) converting said second analog signal, in said analog-to-digital converter, to a second digital signal;
    (m) transferring said second digital signal from said analog-to-digital converter to a controller in said capture device;
    (n) receiving said button up input in said controller from said annotation control button on said capture device;
    (o) storing, by said controller, said second digital signal in said static memory in said capture device as a voice annotation file; and
    (p) connecting said voice annotation file to a data file stored in said static memory.

14. A capture device with voice control input comprising:
    a voice pickup component for capturing a first voice control input command and for outputting said first voice control input command as a first analog signal;
    an analog-to-digital converter, connected to said voice pickup component, for converting said first analog signal into a first digital signal;
    a controller, connected to said analog-to-digital converter, for receiving said first digital signal and for converting said first digital signal into a first recognition pattern;
    a dynamic memory, connected to said controller, for storing said first digital signal and said first recognition pattern;
    a static memory, connected to said controller, for storing at least one recognition pattern in a command recognition table, and for storing in said command recognition table a first set of instructions for performing a predetermined function, wherein said first set of instructions are linked to said at least one recognition pattern;
    a host connection connected to said controller; and
    a host computer system, separate from said capture device, wherein said host connection of said capture device is connected to a communications interface of said host computer system, allowing communication to occur between said capture device and said host computer system, and further wherein a plurality of voice inputs of at least one word to be used for invoking said predetermined function are captured by said voice pickup component, processed in said capture device into a plurality of digital signals which are transferred from said host connection to said communications interface in said host computer system, and further wherein said plurality of digital signals are analyzed with voice analysis software loaded into a memory in said host computer system, generating said at least one recognition pattern for said at least one word from said plurality of digital signals, and said at least one recognition pattern is transferred from said communications interface to said host connection of said capture device and stored in said command recognition table in said static memory in said capture device;

wherein, said controller compares said first recognition pattern with said at least one recognition pattern in said command recognition table stored in said static memory, and further wherein, when said first recognition pattern and said at least one recognition pattern match, said controller executes said first set of instructions linked to said at least one recognition pattern for performing said predetermined function.

15. The capture device with voice control input according to claim 14 wherein said capture device is a scanner device.

16. The capture device with voice control input according to claim 14 wherein said capture device is a digital camera.

17. The capture device with voice control input according to claim 14 wherein said controller converts said first digital signal into said first recognition pattern by performing a plurality of frequency domain transforms on said first digital signal, generating said first recognition pattern, wherein said first recognition pattern is a spectral transform of said first digital signal.

18. The capture device with voice control input according to claim 14 further comprising:

an annotation control button connected to said controller, wherein when button down input from said annotation control button is received by said controller, and until button up input from said annotation control button is received by said controller, a stream of voice input, captured by said voice pickup component between said button down input and said button up input, is converted to a second analog signal, and said second analog signal is converted to a second digital signal by said analog-to-digital converter, and stored as a voice annotation file in said static memory in said capture device, and connected to a data file stored in said static memory.

* * * * *